(12) United States Patent  
Bedard

(10) Patent No.: US 6,379,557 B1  
(45) Date of Patent: Apr. 30, 2002

(54) PROCESS FOR REMOVING CONTAMINANT CATIONS FROM A STREAM WITH HIGH SURFACE AREA TRIPLE LAYERED PEROVSKITES

(75) Inventor: Robert L. Bedard, Mc Henry, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/444,649

(22) Filed: Nov. 22, 1999

Related U.S. Application Data

(63) Continuation-in-part of application No. 09/314,396, filed on May 19, 1999, now Pat. No. 6,042,806, which is a continuation-in-part of application No. 09/998,750, filed on Dec. 29, 1997, now abandoned.

(51) Int. Cl.$^7$ .............................................. B01D 15/04
(52) U.S. Cl. ....................................................... 210/681
(58) Field of Search ................................ 210/681, 688, 210/682, 687

(56) References Cited

U.S. PATENT DOCUMENTS

| | | | |
|---|---|---|---|
| 4,980,333 A | 12/1990 | Landis et al. | ................ 502/246 |
| 5,015,461 A | 5/1991 | Jacobson et al. | ........... 423/593 |
| 5,667,695 A | * 9/1997 | Bedard et al. | .............. 210/681 |

OTHER PUBLICATIONS

J. Mater.Chem. 3(7), 709–713, Uma, S., Raju, A.R. and Gopalakrishnan, Jr.
J. Phys. Chem. 97, 1970–1973 (1993), Yoshimura, J., Ebina, J., Kondo, J. and Domen, K.
Chem. Mater., 6, 907,912 (1994) S. Uma and J. Gopalakrishnana.
Mat. Res. Bull., 27, 981–988(1992), Lewandowski, J.T. and Pickering, I.J.

* cited by examiner

Primary Examiner—Ivars Cintins
(74) Attorney, Agent, or Firm—John G. Tolomei; Frank S. Molinaro

(57) ABSTRACT

A process for synthesizing a family of non-pillared metal oxide triple layered perovskite has been developed. The perovskite has a surface area of at least 30 m$^2$/g and an empirical formula of $$AB_2M_3O_{10-x}$$

where A is a monovalent exchangeable cation such as cesium, B is a divalent or trivalent cation such as strontium or lanthanum and M is a +2, +3, +4 or a +5 valent metal such as niobium, titanium, aluminum or copper. The process involves forming a reaction mixture containing reactive sources of A, B and M at a pH greater than seven and a temperature and time sufficient to form the perovskite. A process for removing contaminants from effluent streams using the above perovskites is also disclosed.

11 Claims, 1 Drawing Sheet

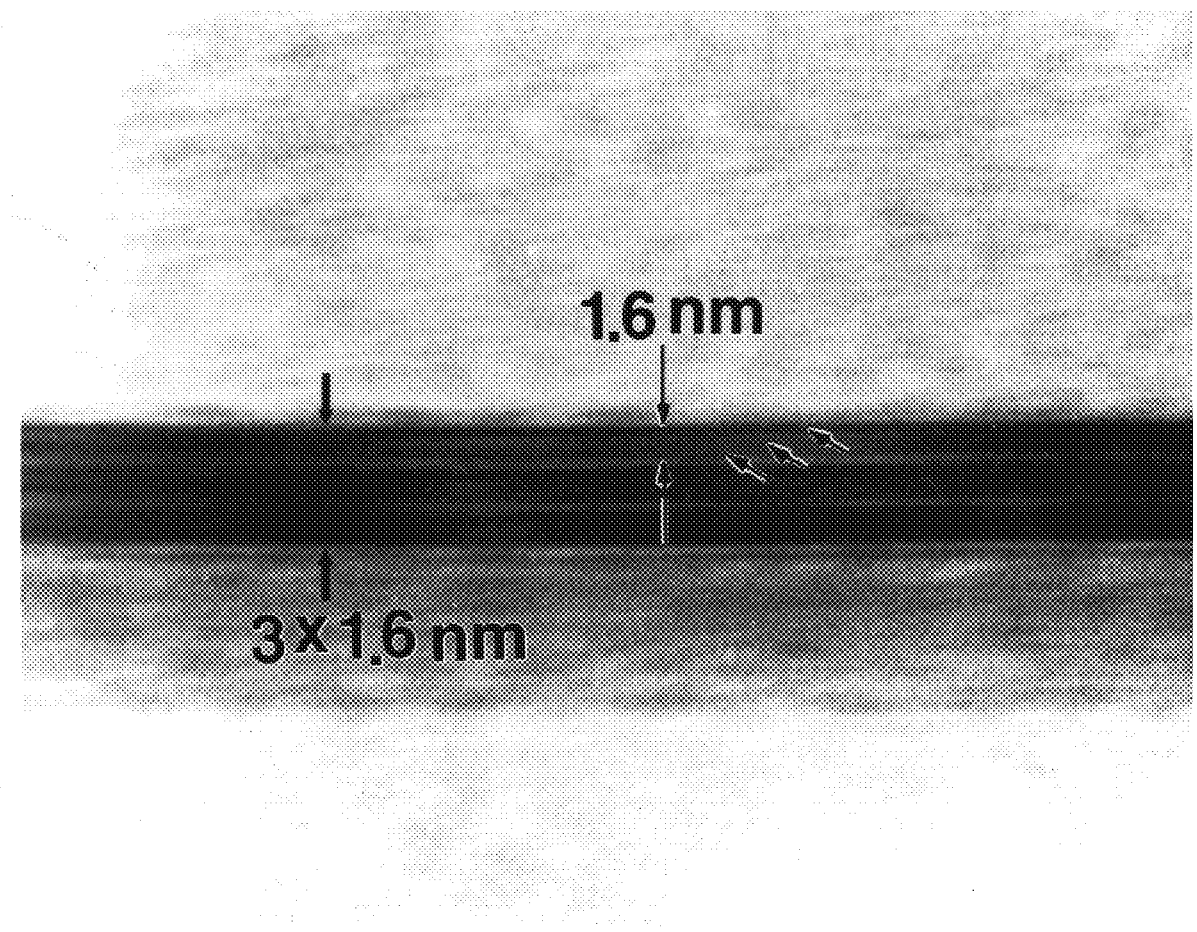

PROCESS FOR REMOVING CONTAMINANT CATIONS FROM A STREAM WITH HIGH SURFACE AREA TRIPLE LAYERED PEROVSKITES

CROSS REFERENCE TO RELATED APPLICATION

This application is a continuation-in-part of copending U.S. application Ser. No. 09/314,396 filed on May 19, 1999 now U.S. Pat. No. 6,042,806 B1 which in turn is a continuation-in-part of U.S. application Ser. No. 08/998,750 filed on Dec. 29, 1997, now abandoned, all of which are incorporated by reference.

FIELD OF THE INVENTION

This invention relates to a process of preparing and a process of using a non-pillared metal oxide triple layered perovskite, having a surface area of at least 30 m²/g and the empirical formula $$AB_2M_3O_{10-x}$$

where A is a monovalent exchangeable cation, B is a divalent or trivalent cation and M is a +2, +3, +4 or +5 valent metal.

BACKGROUND OF THE INVENTION

Various metal oxides are known as catalysts for numerous chemical reactions. One family of such metal oxides are those having the general formula $ABO_3$ and that have the perovskite structure. Perovskites of course have been known for a number of decades and have been shown to have superconducting, ferromagnetic or ferroelectric properties. In addition to the stoichiometric perovskites, there are oxides that have structures derived from the perovskite structure. One category comprises non-stoichiometric compositions such as $ABO_{3-x}$ where the point defects are ordered in a specific manner to produce perovskite superstructures. Examples of these are $Ca_2FeAlO_5$ and $YBa_2Cu_3O_7$. The second category of perovskite-derivative structures are those that contain two-dimensional perovskite layers of composition $A_{n-1}B_nO_{3n+1}$ as one of the units building the layered structure. Another series of layered perovskites has the formula $A'[A_{n-1}B_nO_{3n+1}]$ where A' is K, Rb or Cs. One member of this series is $Cs\,Ca_2Nb_3O_{10}$.

The layered perovskite type oxides are interesting because of the potential to carry out chemistry between the layers. References to layered perovskite oxides include: *Chem. Mater.*, 6, 907–912 (1994) which discloses an anion-deficient layered perovskite with a formula of $ACa_2Nb_{3-x}M_xO_{10-x}$; *J. Mater. Chem.* 3(7), 709–713(1993) which discloses layered oxides having a formula of $A_{2-x}La_2Ti_{3-x}Nb_xO_{10}$; *J. Phys. Chem.*, 97, 1970–1973 (1993), which discloses a niobate layered perovskite having the formula $AL_aSrNb_2M^{II}O_9$.

All of the above described perovskites are prepared by solid state high temperature reaction and consequently have very low surface areas. In order for these perovskite type oxides to have greater widespread utility, it is important to synthesize layered compositions with large surface areas. There are reports of the synthesis of high surface area oxides with the pyrochlore structure. These are: U.S. Pat. No. 5,015,461 which discloses the synthesis of an oxide having the formula $A_2B_2O_7$ where A is a divalent cation and B is niobium and/or tantalum and has the pyrochlore structure and *Mat. Res. Bull.*, 27, 981–988 (1992) disclosing the synthesis of calcium-niobium and tantalum oxides with the pyrochlore structure and high surface area. Finally, U.S. Pat. No. 4,980,333 discloses a layered perovskite containing interspathic polymeric oxides between the layers. These polymeric oxides prop up the layers thereby increasing its surface area.

In contrast to the above art, applicant has synthesized metal oxide triple layered perovskites having a surface area of at least 30 m²/g and an empirical formula of:

$$AB_2M_3O_{10-x}$$

where A is a monovalent exchangeable cation, B is at least one metal ion having a valence of +2 or +3, M is at least one metal ion having a valence of +2, +3, +4 or +5 and "x" has a value from about 0 to about 1. It is also important to note that unlike U.S. Pat. No. 4,980,333, applicant's perovskites do not contain any pillars or interspathic polymeric oxides between the layers.

SUMMARY OF THE INVENTION

As stated the present invention relates to a process for preparing triple layered perovskites and a process for using them. Accordingly one embodiment of the invention is a process for preparing metal oxide triple layered perovskite having a surface area of at least 30 m²/g and an empirical formula of:

$$AB_2M_3O_{10-x}$$

where A is a monovalent exchangeable cation, B is at least one metal ion having a valence of +2 or +3, M is at least one metal ion having a valence of +2, +3, +4 or +5 as defined by the equation:

$$M_3 = M_e^{+2} + M_f^{+3} + M_g^{+4} + M_h^{+5}$$

where "e", "f", "g" and "h" are the mole fractions of $M^{+2}$, $M^{+3}$, $M^{+4}$ and $M^{+5}$ respectively, "e" has a value from about 0 to about 1, "f" has a value from about 0 to about 1, "g" has a value from about 0 to about 3, "h" has a value from about 0 to about 3, 3=e+f+g+h and 1≧e+f and "x" has a value from about 0 to about 1, the process comprising forming a reaction mixture containing reactive sources of "A", "B" and "M" at a pH greater than seven, a temperature and a time sufficient to form the perovskite, the reaction mixture having a composition expressed in terms of mole ratios of oxides of $$aA_2O:bBO_y:cMO_z:dH_2O$$

where "a" has a value of about 0.2 to about 2, "b" has a value of about 2, "y" has a value of about 1.0 to about 1.5, "c" has a value of about 3, "z" has a value of about 1.67 to about 2.5 and "d" has a value of about 10 to about 500.

Another embodiment of the invention is a process for removing contaminant ions from a stream comprising contacting the stream with a metal oxide triple layered perovskite at exchange conditions for a time sufficient to exchange the contaminant ion for an exchangeable cation on the perovskite, a surface area of at least 30 m²/g and an empirical formula of:

$$AB_2M_3O_{10-x}$$

where A is a monovalent exchangeable cation, B is at least one metal ion having a valence of +2 or +3, M is at least one metal ion having a valence of +2, +3, +4 or +5 and defined by the equation $$M_3 = M_e^{+2} + M_f^{+3} + M_g^{+4} + M_h^{+5}$$

where e, f, g and h are the mole fractions of $M^{+2}$, $M^{+3}$, $M^{+4}$ and $M^{+5}$ respectively, "e" has a value from about 0 to about 1, "f" has a value from about 0 to about 1, "g" has a value from about 0 to about 3, "h" has a value from about 0 to about 3, $3=e+f+g+h$ and $1 \geq e+f$ and "x" has a value from about 0 to about 1.

These and other objects and embodiments of the invention will become more apparent after the following detailed description of the invention.

BRIEF DESCRIPTION OF THE FIGURE

The FIGURE is a lattice image obtained by High Resolution Electron Microscopy of sample C of Example 3.

DETAILED DESCRIPTION OF THE INVENTION

The perovskite compositions which form the basis of the instant invention are described by the empirical formula $$AB_2M_3O_{10-x}$$

where "x" has a value of about 0 to about 1, A is a monovalent exchangeable cation selected from the group consisting of cesium, rubidium, potassium and mixtures thereof. B is at least one metal ion having a valence of +2 or +3. Examples of the B metal ions include calcium (+2), strontium (+2), lanthanum (+3), cerium (+3), and mixtures thereof. M is at least one metal ion having a Evalence of +2, +3, +4 or +5. Although M can be only a +4 valent metal or a +5 valent metal, it cannot be only a +2 valent and/or a +3 valent metal. That is the total amount of the M metal can be represented by the equation:

$$M_3 = M_e^{+2} + M_f^{+3} + M_g^{+4} + M_h^{+5}$$

then, $3=e+f+g+h$ where "e" is the mole fraction of $M^{+2}$, "f" is the mole fraction of $M^{+3}$, "g" is the mole fraction of $M^{+4}$ and "h" is the mole fraction of $M^{+5}$, and "e" has a value from about 0 to about 1, "f" has a value from about 0 to about 1, "g" has a value from about 0 to about 3, "h" has a value from about 0 to about 3 and $1 \geq e+f$. The M metal includes but is not limited to niobium, titanium, aluminum, gallium, iron, indium, zinc, copper, nickel and mixtures thereof. These perovskite compositions are prepared by a hydrothermal synthesis of a reaction mixture prepared by combining reactive sources of the desired components. Specific examples of these reactive sources include but are not limited to hydrated niobium oxide, niobium pentaethoxide, ammonium niobium oxalate, and niobium niobium oxalate. The sources of titanium include titanium trichloride, titanium tetrachloride, titanium tetraethoxide, and amorphous titanium oxide. Aluminum sources include pseudo boehmite, aluminum nitrate, and aluminum triethoxide. Indium sources include indium oxide, indium hydroxide, indium sulfate, and indium acetate. Zinc, copper, iron, and nickel sources include the acetates, the nitrates and the chlorides. Lanthanum and cerium sources include the nitrates, chlorides, triisopropoxides, and oxalate hydrates. Calcium and strontium sources include the hydroxides, chlorides, and the nitrates. Alkali sources include potassium hydroxide, rubidium hydroxide, cesium hydroxide, potassium carbonate, rubidium carbonate, cesium carbonate, potassium halide, rubidium halide, cesium halide, potassium ethylenediamine tetraacetic acid (EDTA), rubidium EDTA, and cesium EDTA.

Generally, the hydrothermal process used to prepare the high surface area layered perovskites of this invention involves forming a reaction mixture which in terms of molar ratios of the oxides is expressed by the formula:

$$a\ A_2O{:}b\ BO_y{:}c\ MO_z{:}d\ H_2O$$

where "a" has a value from about 0.2 to 2, "b" has a value of about 2, "y" has a value from about 1.0 to about 1.5 depending on whether B has a valence of +2, +3 or a combination thereof, "c" has a value of about 3, "z" has a value which is determined by the valence of the M metal or metals and varies from about 1.67 to about 2.5 and "d" has a value of about 10 to 500. As stated if M is a combination of metals which includes +2 and/or +3 metals, then the total amount of +2 and +3 metal cannot be greater than 1/3 c, i.e., 1/3 of the total M metal content. It is also necessary that the mixture have a basic pH, i.e., greater than seven, and preferably a pH of at least 10. The basicity of the mixture is controlled by adding alkali hydroxide and/or basic compounds of the other constituents of the mixture. Having formed the reaction mixture it is next reacted at a temperature of about 100° C. to about 250° C. for a period of about 1 to about 30 days in a sealed reaction vessel under autogenous pressure. After the required time, the mixture is filtered or centrifuged to isolate the solid product which is washed with deionized water or dilute alkali hydroxide solution and dried in air.

The metal oxide compositions are characterized in that they have a triple layered perovskite structure. By this is meant that the metal oxide framework is composed of three layers of vertex-shared $MO_6$ octahedra or three layers of $MO_6$ octahedra wherein some of the octahedra in each middle layer are replaced with $MO_4$ tetrahedra or $MO_5$ square pyramids. Cages, made up of eight vertex shared $MO_{4-6}$ polyhedra, are present between the first and second layers as well as the second and third layers. The larger B cations reside in these cages. The metal oxide polyhedral framework is discontinuous, creating an interlamellar space where the largest A cations reside between the triple layers. Additionally these compositions have a much greater surface area than compositions prepared by solid state reactions. Generally, these compositions will have a surface area of at least 30 m²/g and preferably greater than 50 m²/g. It is also important to note that the compositions of the present invention do not have any pillars or propants between any of the layers (Cf. U.S. Pat. No. 4,980,333).

Since the A cations are exchangeable, they can be exchanged for secondary (A'), i.e., different cations. That is, the perovskite can be synthesized using one cation and then exchanged with another cation. The A' cation can be a +1, +2 or +3 valence cation. Generally, the A exchangeable cations can be exchanged for secondary alkali metal cations ($K^+$, $Na^+$, $Rb^+$, $Cs^+$), alkaline earth cations ($Mg^{2+}$, $Ca^{2+}$, $Sr^{2+}$, $Ba^{2+}$), hydronium ion, ammonium ion or mixtures thereof. Since the initial, i.e., as synthesized, A cation is a monovalent cation, the triple-layered perovskite after exchange is described by the empirical formula:

$$A'_{(1/n)}B_2M_3O_{10-x}$$

where A' is an exchangeable cation having a valence of "n", which has a value of +1, +2 or +3, and B, M and "x" are as defined above.

The methods used to exchange one cation for another are well known in the art and involve contacting the metal oxide composition with a solution containing the desired cation at exchange conditions. Exchange conditions include a temperature of about 25° C. to about 100° C. and a time of about 20 minutes to about 2 hours. Given the high surface area of the subject materials and the resulting facility for ion exchange, a small portion of the B site cations may also exchange under certain ion exchange conditions, particularly when the exchanging ion is H+ under acidic conditions. This slight B site exchange does not disrupt the triple layered perovskite framework.

Owing to the triple layered structure of the compositions of this invention, they are useful as ion exchange materials. That is the exchangeable cation present between the layers can be exchanged for undesirable cations, i.e., contaminant ions, in an effluent stream. Thus, contaminant ions present in various streams can be removed by contacting the stream with the metal oxide compositions. The contacting can be carried out either in a batch mode or in a continuous mode. In a batch mode, the desired composition is placed in an appropriate container and the streams to be treated mixed therewith. Contacting is carried out for a time of about 0.1 to about 100 hr. at a temperature of about 25° C. to about 100° C. In a continuous mode, the metal oxide is placed in a column and the stream to be treated is flowed through it, usually downflow, until the contaminant ion is detected in the effluent of the column. The perovskites which can be used in this process are either the perovskite as synthesized, i.e., contains A cations, or those that contain secondary (A') cations.

The triple-layer perovskite structure can be identified by X-ray powder diffraction and/or lattice imaging by high resolution electron microscopy (HREM). The layered perovskites of highest surface area, approximately greater than 60 m²/g, are preferably identified by HREM techniques, because the broad peaks observed in the X-ray diffraction pattern make identification difficult. The broadness of the X-ray diffraction peaks arise from the extremely small crystal size of the highest surface area products, which display dimensions less than 10 unit cells thick along the "c" axis direction. These small crystal dimensions cause all diffraction peaks of non zero "I" index to broaden substantially, thereby preventing both quantitative location of diffraction peaks and accurate X-ray pattern indexing. HREM imaging allows actual imaging of the triple perovskite layers as well as the interlamellar spaces.

The X-ray patterns (when substantial peak broadening is absent) of as-synthesized triple layered perovskite structures can be generally indexed on tetragonal unit cells with axial dimensions that are multiples of a=3.9±0.1 Å and c=15±1.5 Å. Tetragonal unit cells with doubled "a" axis (7.8±1.5 Å) can occur with slight distortions of the coordination environments of the "M" metals. Additionally, tetragonal unit cells with doubled "c" axis, or c=30±3 Å, can occur with changes in the layer registry of the triple layers. The greater indicated variability in the "c" axis dimension is a consequence of the varied cations that can be present in the "A" site positions as well as possible solvation of these cations in the interlamellar space by solvent molecules. The overall topology of the layered perovskite structure is not changed when these cations are ion exchanged into the interlamellar spaces.

The following examples are set forth to illustrate the invention. It is to be understood that the examples are only by way of illustration and are not intended as an undue limitation on the broad scope of the invention as set forth in the appended claims.

EXAMPLE 1

Preparation of a Cs—Sr—Nb—O Perovskite

A solution was prepared by dissolving 23.40 gm of $Sr(OH)_2.8H_2O$ in 19.13 gm deionized water with stirring. To this solution, 7.40 gm $CsOH.H_2O$ was added followed by the addition of 25.08 gm $Nb_2O_5.xH_2O$ while stirring. The resulting mixture was white and opaque with crystals apparent. The mixture was mixed for 10 minutes at room temperature and then blended at high speed for 3 minutes to achieve a homogeneous mixture. The final mixture had a pH of 13.58 with an empirical formula of:

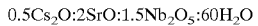

$0.5Cs_2O:2SrO:1.5Nb_2O_5:60H_2O$

The reaction mixture was reacted for 3 days at 200° C. After the reaction was complete, the solid was isolated by filtration, washed with water and then air dried. Elemental analysis revealed the presence of 12.7 wt % Cs, 25.1 wt % Sr, 38.7 wt % Nb with a 3.49 wt % LOI. A Nitrogen BET surface area measurement indicated a surface area of 58 m²/g.

X-ray diffraction analysis showed that this sample had the triple layer perovskite structure, with unit cell parameters: tetragonal, a=b=7.80 Å and c=15.41 Å. This sample was identified as sample A.

EXAMPLE 2

Preparation of a Cs—Sr—Al—Nb—O Perovskite

To 257.13 gm of deionized water there were added 72.13 gm $CsOH.H_2O$. After the cesium hydroxide was dissolved, 163.16 gm $Nb_2O_5.xH_2O$ was added with stirring. To this mixture there were added 29.25 gm $Al_2O_3$ (75%) and 228.33 gm $Sr(OH)_2.8H_2O$ with stirring during and after each addition. The mixture was blended for 2 minutes to achieve a homogenous mixture. The final mixture had pH of 13.76 with an empirical formula of

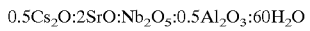

$0.5Cs_2O:2SrO:Nb_2O_5:0.5Al_2O_3:60H_2O$

The reaction mixture was placed in a stirred reactor and heated to 200° C. for 3 days. After this time, the solid was isolated by filtration, washed and dried in air at room temperature. Elemental analysis revealed the presence of 1.08 wt % Cs, 38.7 wt % Sr, 33.0 wt % Nb, 2.79 wt % Al, 0.7 wt % C, 1.8 wt % H with a 17.56 wt % LOI. A Nitrogen BET surface area measurement indicated a surface area of 70 m²/g X-ray diffraction and HREM analysis showed that this composition had the triple layer perovskite structure. This sample was identified as sample B.

EXAMPLE 3

Preparation of a Cs—Sr—Ti—Nb—O Perovskite

A solution was prepared by mixing 12.26 gm $CsOH.H_2O$ in 13.71 gm deionized water. After the cesium hydroxide was dissolved, 19.41 gm $Sr(OH)_2.8H_2O$ was added with stirring. To this mixture, 13.86 gm of $Nb_2O_5.xH_2O$ were added with stirring and 1.6 gm of $Ti(OC_3H_7)_4$ were added dropwise with mixing. The mixture was blended for 2 minutes and 9.10 gm of deionized water was used as a wash. The final mixture has a pH of 12.06 with an empirical formula of

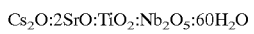

$Cs_2O:2SrO:TiO_2:Nb_2O_5:60H_2O$

The reaction mixture was transferred to a reactor and heated for 3 days at 200° C. The solid reaction products were isolated by filtration, washed with deionized water and dried at room temperature. Chemical analysis of this product revealed the presence of 8.71 wt % Cs, 31.7 wt % Sr, 1.63 wt % Ti, and 34.3 wt % Nb (all volatile free), with a 6.87 wt % LOI. A Nitrogen BET surface area measurement indicated a surface area of 84 m²/g X-ray diffraction and HREM analysis showed that this composition had the triple layered perovskite structure. This sample was identified as sample C. The lattice image obtained by HREM is shown in THE FIGURE. The triple layers are shown by the three diagonal arrows. The measurement of 1.6 nm(16 Å) and 3×1.6 nm(48 Å) indicate the c axis and crystal thickness, respectively, as measured by TEM. Note that there are no pillars between any of the layers.

EXAMPLE 4

Ion Exchange Using HNO₃

A 6M HNO₃ solution was prepared. To about 200 ml of this solution, 15.57 gm of sample A was added. This mixture was shaken in a water bath at 60° C. for approximately 24 hours. After this time, the solution was decanted and approximately 200 ml of fresh 6M HNO₃ was added. Again, this solution was shaken in a water bath at 60° C. This was repeated for a total of 3 solution changes. The solid was collected by centrifugation and washed with deionized water. The solid was dried at 50° C. for approximately 24 hours.

Elemental analysis revealed the following composition: 0.52 wt % Cs, 23.9 wt % Sr, 49.9% Nb, 0.7 wt % H (all volatile free) with a 7.99 wt % LOI. The analytical data indicates that 96% of the original Cs⁺ cations had been ged by H⁺ cations.

I claim as my invention:

1. A process for removing contaminant cations from a stream comprising contacting the stream with a non-pillared metal oxide triple layered perovskite at exchange conditions for a time sufficient to exchange the contaminant cation for an exchangeable cation on the perovskite, the perovskite having a surface area of at least 30 m²/g and an empirical formula of:

$$AB_2M_3O_{10-x}$$

where A is a monovalent exchangeable cation, B is at least one metal ion having a valence of +2 or +3, M is at least one metal ion having a valence of +2, +3, +4 or +5 and defined by the equation $$M_3=M_e^{+2}+M_f^{+3}+M_g^{+4}+M_h^{+5}$$

where "e", "f", "g" and "h" are the mole fractions of M⁺², M⁺³, M⁺⁴ and M⁺⁵ respectively, "e" has a value from 0 to about 1, "f" has a value from 0 to about 1, "g" has a value from 0 to about 3, "h" has a value from 0 to about 3, 3=e+f+g+h and 1≧e+f and "x" has a value from 0 to about 1.

2. The process of claim 1 where the exchange conditions include a contact time of about 0.1 to about 100 hr. and a temperature of about 25° C. to about 100° C.

3. The process of claim 1 where the contact time is from about 0.1 to about 100 hr.

4. The process of claim 1 where the process is carried out in a continuous mode.

5. The process of claim 1 where A is selected from the group consisting of cesium, rubidium, potassium and mixtures thereof.

6. The process of claim 1 where B is selected from the group consisting of calcium, strontium, lanthanum, cerium and mixtures thereof.

7. The process of claim 1 where M is selected from the group consisting of niobium, titanium, aluminum, gallium, iron, indium, antimony, zinc, nickel, copper and mixtures thereof.

8. A process for removing contaminant cations from a stream comprising contacting the stream with a non-pillared metal oxide triple layered perovskite at exchange conditions for a time sufficient to exchange the contaminant cation for an exchangeable cation on the perovskite, the perovskite having a surface area of at least 30 m²/g and an empirical formula of:

$$A'_{(1/n)}B_2M_3O_{10-x}$$

where A' is an exchangeable cation having a valence of "n" where "n" has a value of +1, +2 or +3, B is at least one metal ion having a valence of +2 or +3, M is at least one metal ion having a valence of +2, +3, +4 or +5 and defined by the equation $$M_3=M_e^{+2}+M_f^{+3}+M_g^{+4}+M_h^{+5}$$

where "e", "f", "g" and "h" are the mole fractions of M⁺², M⁺³, M⁺⁴ and M⁺⁵ respectively, "e" has a value from about 0 to about 1, "f" has a value from 0 to about 1, "g" has a value from 0 to about 3, "h" has a value for 0 to about 3, 3=e+f+g+h and 1≧e+f and "x" has a value from 0 to about 1.

9. The process of claim 8 where the exchange conditions include a contact time of about 0.1 to about 100 hr. and a temperature of about 25° C. to about 100° C.

10. The process of claim 8 where the contact time is from about 0.1 to about 100 hr.

11. The process of claim 8 where the process is carried out in a continuous mode.

* * * * *